United States Patent [19]
Jeziorowski

[11] Patent Number: 5,096,303
[45] Date of Patent: Mar. 17, 1992

[54] ELECTRONIC CIRCUIT ARRANGEMENT FOR TEMPERATURE MEASUREMENT BASED ON A PLATINUM RESISTOR AS A TEMPERATURE SENSING RESISTOR

[75] Inventor: Marek Jeziorowski, Oslo, Norway
[73] Assignee: NORAPP, Oslo, Norway
[21] Appl. No.: 623,980
[22] PCT Filed: Apr. 6, 1990
[86] PCT No.: PCT/NO90/00062
§ 371 Date: Dec. 21, 1990
§ 102(e) Date: Dec. 21, 1990
[87] PCT Pub. No.: WO90/13009
PCT Pub. Date: Nov. 1, 1990

[30] Foreign Application Priority Data
Apr. 25, 1989 [NO] Norway .................. 89.1695
[51] Int. Cl.⁵ .................................... G01K 7/24
[52] U.S. Cl. ........................... 374/173; 374/183; 330/260; 330/256
[58] Field of Search ............ 374/163, 171, 172, 173, 374/183; 323/364, 365, 366, 367; 330/143, 256, 260

[56] References Cited

U.S. PATENT DOCUMENTS

| | | | |
|---|---|---|---|
| 3,139,753 | 7/1964 | Brudner | 374/183 |
| 3,754,442 | 8/1973 | Arnett | 374/173 |
| 3,783,692 | 1/1974 | Hansen | 374/173 |
| 3,857,285 | 12/1974 | Athey et al. | 374/183 |
| 3,903,743 | 9/1975 | Noller | 374/158 X |
| 4,114,446 | 9/1978 | Walsh | 374/183 X |
| 4,301,421 | 11/1981 | Yokoyama | 330/260 X |
| 4,516,865 | 5/1985 | Hideo | 374/172 |
| 4,699,520 | 10/1987 | Wallenfang | 374/183 |

FOREIGN PATENT DOCUMENTS

| | | | |
|---|---|---|---|
| 2482381 | 11/1981 | France | 330/256 |
| 178234 | 10/1983 | Japan | 374/173 |
| 1432349 | 10/1988 | U.S.S.R. | 374/183 |

*Primary Examiner*—William A. Cuchlinski, Jr.
*Assistant Examiner*—G. Bradley Bennett
*Attorney, Agent, or Firm*—Fleit, Jacobson, Cohn, Price, Holman & Stern

[57] ABSTRACT

Electronic circuit arrangement in a temperature measurement circuit based on a platinum resistor (PT) as a temperature sensing resistor, whereby in addition to the platinum resistor there is provided a reference resistor (R1). The measurement circuit (S) is adapted to apply equally large DC currents (I5, I6) to both resistors having a common return lead (3) from these, and to sense the resulting voltage difference (U) across the resistors. By means of at least one operational amplifier (G) the voltage difference is adapted to cause an output DC current from the measurement circuit (S) being proportional to the voltage diffeerence and thereby constituting a measure of the temperature of the platinum resistor (PT). The measurement circuit (S) comprises means (L) for compensating for non-linearity of the temperature-resistance characteristic of the platinum resistor. Two transistors (T1, T2) are provided, of which the collector output currents (I3, I4) are each adapted to be added to its said respective equally large DC current (I6, I5) being applied to the platinum resistor (PT) and the reference resistor (R1) respectively. The emitter-base voltage of the transistors is adapted to vary depending upon the output DC current from the measurement circuit (S).

3 Claims, 2 Drawing Sheets

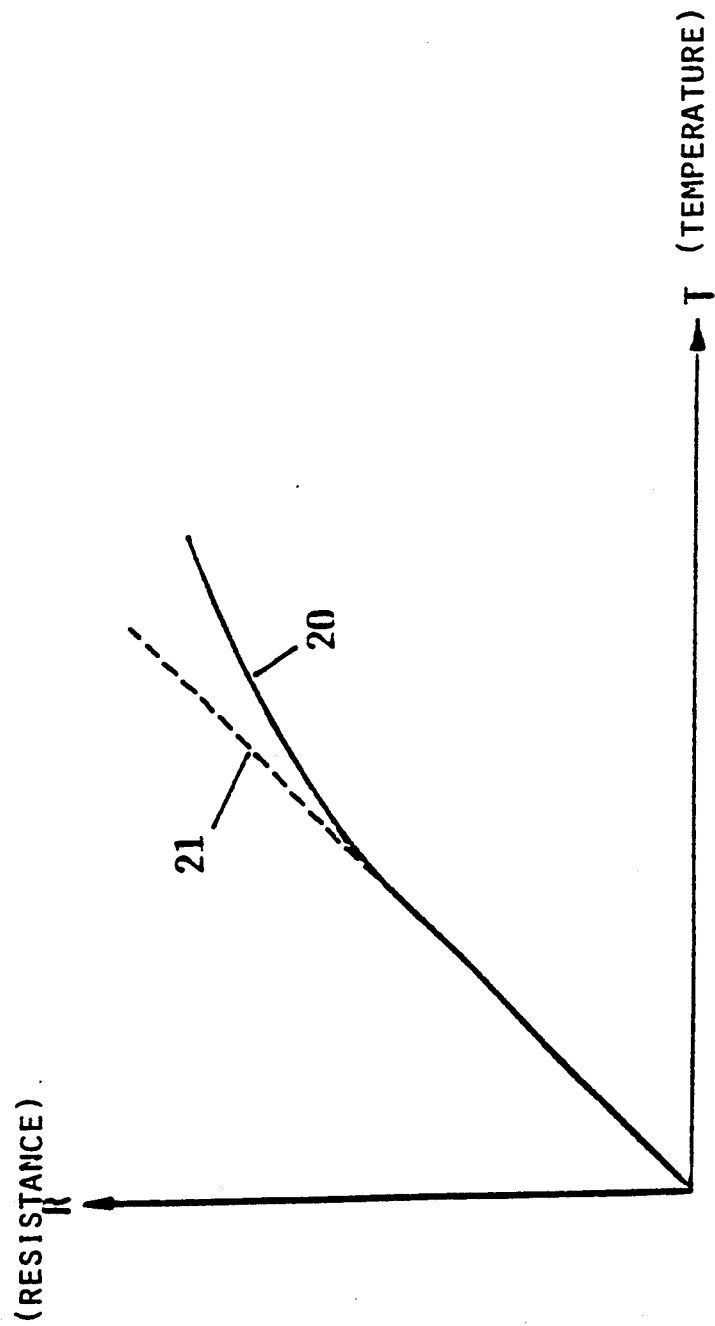

ELECTRONIC CIRCUIT ARRANGEMENT FOR TEMPERATURE MEASUREMENT BASED ON A PLATINUM RESISTOR AS A TEMPERATURE SENSING RESISTOR

FIELD OF THE INVENTION

This invention relates to an electronic circuit arrangement in a type of temperature measurement circuit based on a platinum resistor as a temperature-sensing resistor. In this particular type of measurement circuit, a reference resistor is provided in addition to the platinum resistor, and the measurement circuit is adapted to apply equally large DC currents to both resistors, both resistors having a common return lead. The resulting voltage difference across the resistors is sensed, and by means of at least one operational amplifier this voltage difference is adapted to cause an output DC current from the measurement circuit. This DC current shall be proportional to the voltage difference in order to constitute a measure of the temperature in the temperature-resistance characteristic of the platinum resistor, measurement circuits are which comprise devices for compensating for this non-linearity.

BACKGROUND OF THE INVENTION

A frequently employed and more or less standardized platinum temperature sensor has the type designation PT-100 and this has a primary interest in this connection. Known temperature measurement circuits, for co-operation with such platinum resistors, are available in the form of an integrated circuit or chip, among other things based on a three conductor principle at the input side for connection to the platinum resistor, the reference resistor respectively and with a common return lead as mentioned above. As far as the output of the measurement circuit is concerned, the invention is directed to a situation where the output DC current mentioned appears at two output terminals, for simple and practical adaption to the circuits or the system in which the temperature measurement is to be involved.

More particularly there exist previously known circuits which carry out the necessary linearizing in connection with, for example, the plantinum resistor of type PT-100 mentioned, including solutions based on an increase of the applied current in the sensor when the temperature rises.

U.S. Pat. No. 3,783,692 shows a measurement circuit in which a platinum sensing resistor is incorporated in a bridge configuration. Linearizing of the sensor is obtained by increasing the current therein by means of a specific current source having a negative resistance. Here there is the question of a rather complicated circuit in which it is difficult to calculate the component values for adaption to different temperature ranges to be covered by the measurements.

U.S. Pat. No. 3,754,442 describes a measurement circuit adapted to co-operate with different sensors having different non-linearity. The sensor is connected into a feed-back loop in an operational amplifier. A second operational amplifier controls an indicator and acts to vary the current in the sensor depending upon the output voltage. A rather complicated circuit is also involved there, due to among other things, it is to co-operate with different sensors.

European Patent 0 101 956 relates to a measurement circuit designed with a common differential amplifier in cooperation with a traditional source of current in a four-conductor measurement principle. The output voltage controls the source of current so that the current in the sensor increases with a rising temperature.

U.S. Pat. No. 4,114,446, similarly to some of the patent specifications above, is directed to a relatively complicated measurement circuit comprising a source of current and various amplifiers which by means of several feed-back loops are adapted to linearize the sensing resistor.

SUMMARY OF THE INVENTION

The object of this invention is to provide an arrangement of temperature measurement circuits of the kind described, being based on other and much simpler means than what is previously known, in order to carry out the desired linearizing.

BRIEF DESCRIPTION OF THE DRAWINGS

In the following description the invention will be explained more closely with reference to the drawings, in which:

FIG. 2 illustrates a typical characteristic of platinum sensing resistors having a non-linearity to be compensated for.

DETAILED DESCRIPTION OR THE PREFERRED EMBODIMENT

Figure 1:
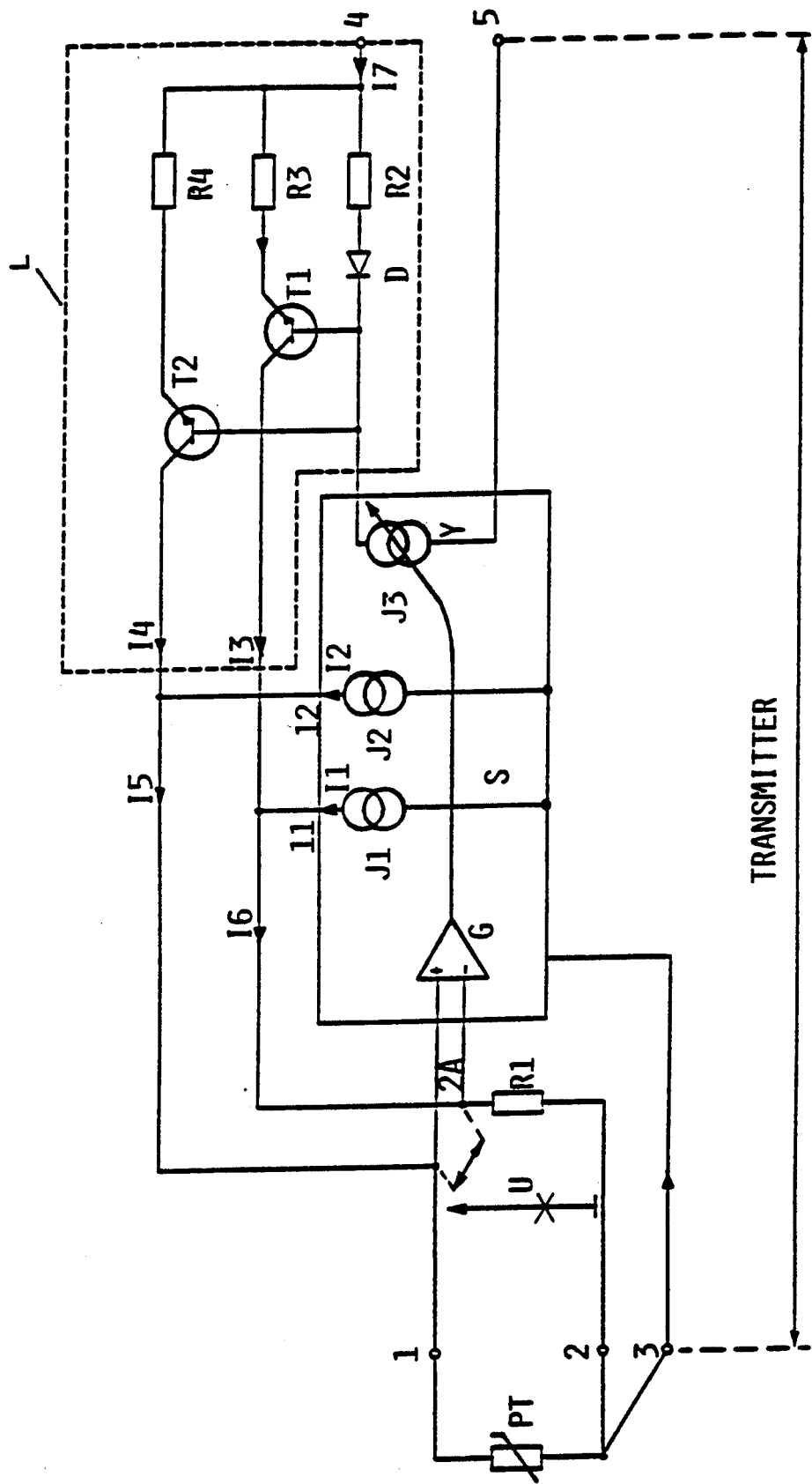
FIG. 1 shows a simplified diagram of a temperature measurement circuit based on an embodiment of the arrangement according to the invention.

In the diagram of FIG. 1 there is shown a platinum resistor PT and a reference resistor R1 being both connected to a main component in the measurement circuit, i.e. the block S which according to known techniques can consist of an integrated circuit especially manufactured for cooperation with this particular type of temperature sensing resistor PT. As seen in FIG. 1 the platinum resistor PT and the reference resistor R1 at the input side of the circuit S are connected thereto through three terminals or leads 1, 2A and 3, whereby the leads 1 and 2A constitute the inputs to an operational amplifier G which is incorporated in the integrated circuit S. Thus at the input side there is a structure for taking advantage of the so-called three-conductor measurement principle, which is known in connection with measurement circuits for platinum sensing resistors.

Circuit S has two outputs 11, 12 for the delivering constant DC currents I1 and I2 respectively, adapted to flow through reference resistor R1 and temperature sensor PT respectively, and having a common return lead 3 to a common point or earth for the complete measurement circuit including the integrated circuit S. These two DC currents being in principle constant, generate a higher or lower input voltage to the operational amplifier G depending upon the existing resistance value of the sensor PT, determined by the temperature sensed thereby. The integrated circuit S, on the basis of the output from the operational amplifier G via internal circuits not shown, is adapted to cause an output circuit Y to deliver a DC current at the output terminals 4 and 5. The amplitude of this DC current I7 is proportional to the input voltage on the operational amplifier G.

For example the integrated circuit S can be of the type XTR101 supplied by the firm Burr Brown, USA.

Thus what has been described this far with reference to FIG. 1, is related to a known and conventional measurement circuit, being intended, for example, for use in instrumentation, control systems or programmable logical controls.

The output DC current I7 through terminals 4 and 5 in such conventional circuits can, for example, be adapted to be within the range from 4 to 20 mA, in order to co-operate with other parts or circuits in such systems.

The non-linearity problem which leads to difficulties and complications in such measurement circuits is illustrated in FIG. 2. This figure shows electrical resistance as a function of temperature for a typical platinum resistor, in the form of the curve or characteristic 20, which over a long distance coincides quite closely to a rectilinear, ideal characteristic 21, but at higher temperatures falls off and deviates relatively much from the straight line. This non-linearity will result in inaccuracies in the temperature measurements, if precautions are not taken for compensating for the non-linearity by providing specific means in, or connected to, the measurement circuit. What is aimed at is, that the DC current which constitutes the output signal from the measurement circuit shall have a high degree of proportionality to the temperature of the temperature sensing resistor, over the whole temperature range which it is desirable that the measurement concerned shall cover.

In the diagram of FIG. 1 the dashed line block L indicates a circuit solution based on the present invention, which serves to bring about the required linearizing in a very simple but at the same time accurate manner. Essential components in the circuit part L are two transistors T1 and T2 adapted to deliver DC currents I3 and I4 respectively, which are added to said constant currents I1 and I2 respectively, with resulting total DC currents I5 and I6 which are applied to the sensing resistor PT and the reference resistor R1 respectively. The additional currents I3 and I4 being supplied by transistors T1 and T2 are determined by a voltage generated by the output DC current I7 at terminal 4, which results in a voltage drop across the series resistor R2 shown, having a diode D in series therewith. An increasing DC current I7 gives an increase in the currents I3 and I4 and a corresponding increase of the currents I6 and I5. Thereby, a rising temperature at sensor PT will involve a higher voltage increase input to the operational amplifier G than would otherwise have been the case, and the inherent non-linearity of the sensor PT is compensated for.

With current directions and polarities as shown, the conducting direction of diode D will be as shown in the diagram, and the transistors T1 and T2 are taken to be PNPtransistors. The additional or compensational currents I3 and I4 are supplied from the collectors of the two transistors, the emitter-base voltage of each of the transistors determining the magnitude of the currents I3 and I4. As will appear from the diagram the voltage drop across the resistor R2 and the diode D will have an equal influence on the emitter-base voltage of both transistors and thereby ensure that the resulting total DC current being applied to the platinum resistor PT and the reference resistor R1 respectively, are equal all the time. The magnitude of the additional or compensational currents I3 and I4 can be adjusted by means of the resistors R3 and R4 in the emitter circuit of both transistors. In this way the compensation can be adapted according to the temperature range in which the sensing resistor PT is to operate.

The diode D is inserted in order to compensate for the influence of ambient temperature on the transistors T1 and T2 and thereby on the additional currents I3 and I4.

As transistors T1 and T2 it is suitable to employ transistor types having a high current amplification at low collector currents. Based on embodiments in which the constant DC currents I1 and I2 from the integrated circuit S have a nominal magnitude of 1 mA, the additional current I3 and I4 in frequently occurring applications of such a measurement circuit advantageously can lie in a range of from 5-150 $\mu$A.

I claim:

1. Electronic circuit arrangement for temperature measurement based on a platinum resistor as a temperature sensing resistor, comprising the platinum resistor; a reference resistor connected at a first terminal to a first terminal of the platinum resistor to form a common return lead; and a measurement circuit, having first and second outputs connected to a second terminal of each of said platinum and reference resistors respectively, for applying DC currents to the second terminal of both said platinum and reference resistor, and having a first input connected to the common return lead of said platinum and reference resistors, said measurement circuit having second and third inputs, connected to the second terminal of each of said platinum and reference resistors respectively, for sensing a voltage difference across said platinum and reference resistors and comprising at least one operational amplifier to which a signal corresponding to said voltage difference is applied, said measurement circuit further having a third output for delivering a DC current proportional to said sensed voltage difference constituting a measure of the temperature of said platinum resistor; said arrangement further comprises means for compensating for non-linearity of a temperature-resistance characteristic of the platinum resistor, said compensating means comprising first and second transistors each having collector output circuits connected in parallel to said outputs of said measurement circuit, respectively, for adding respective collector currents of said first and second transistors to said DC currents, and each of said first and second transistors having an emitter-base circuit connected to said third output of said measurement circuit wherein an emitter base voltage of each of said first and second transistors vary dependent upon said DC current.

2. The arrangement according to claim 1 further comprising a series resistor connected to the third output of the measurement circuit as an output lead for the DC current, said series resistor also being incorporated in the emitter-base circuit of the first and second transistors of the compensating means to vary the emitter-base voltage.

3. The arrangement according to claim 2, further comprising a diode in series with the series resistor, wherein said diode is also incorporated in the emitter-base circuit of the transistors.

* * * * *